(12) United States Patent
Moore et al.

(10) Patent No.: US 7,397,865 B2
(45) Date of Patent: Jul. 8, 2008

(54) SYSTEMS AND METHODS OF USING IQ MODULATION FOR CALIBRATION OR MEASUREMENT

(75) Inventors: George S. Moore, Veradale, WA (US); Raymond A. Birgenheier, Spokane, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 828 days.

(21) Appl. No.: 10/405,555

(22) Filed: Apr. 2, 2003

(65) Prior Publication Data

US 2004/0196925 A1 Oct. 7, 2004

(51) Int. Cl.
*H04L 27/20* (2006.01)

(52) U.S. Cl. ........................ 375/308; 375/324; 375/340; 375/224; 324/614; 702/108; 702/112; 702/124; 702/126

(58) Field of Classification Search ................ 375/308, 375/224, 324, 340; 324/614; 702/108, 112, 702/124, 126
See application file for complete search history.

(56) References Cited

U.S. PATENT DOCUMENTS

| | | | | |
|---|---|---|---|---|
| 5,748,309 A | * | 5/1998 | van der Weide et al. | 356/326 |
| 5,994,932 A | * | 11/1999 | Ando | 327/156 |
| 6,130,908 A | * | 10/2000 | Pon | 375/227 |
| 6,405,147 B1 | * | 6/2002 | Fera | 702/112 |
| 6,452,843 B1 | * | 9/2002 | Zheng et al. | 365/191 |
| 6,940,938 B2 | * | 9/2005 | Altman et al. | 375/376 |

* cited by examiner

*Primary Examiner*—Ted Wang

(57) ABSTRACT

A system analyzer may generate an estimated frequency response of a device, system, communication medium, or combination thereof by utilizing a stimulus signal that is robust against IQ modulator impairments. A stimulus generator may be used to generate a plurality of discrete tones according to a frequency spacing and a frequency offset. The frequency spacing and the frequency offset cause spectrally inverted spurs (generated by impairments of the IQ modulator) to occur at frequencies other than frequencies of said modulated signal that are associated with said plurality of discrete tones. Additionally, by implementing a Discrete Fourier Transform (DFT) to possess a frequency resolution equal to the frequency offset, there is no leakage of power associated with the spectrally inverted spurs into frequency bins of the DFT associated with the desired frequency components. Likewise, leakage between the desired frequency components and leakage associated with the local oscillator may be avoided.

17 Claims, 2 Drawing Sheets

SYSTEMS AND METHODS OF USING IQ MODULATION FOR CALIBRATION OR MEASUREMENT

TECHNICAL FIELD

The present invention is related to RF/IF system analysis and, more particularly, to the generation of a signal to be IQ-modulated for use in RF/IF system analysis.

BACKGROUND

When a radio frequency (RF)/intermediate frequency (IF) device or system is calibrated or analyzed, a signal of a known spectral content is provided to the device or system and the resulting signal is then analyzed to estimate the response of the device or system. Signals with precisely known amplitude and phase relationships may be readily created in the digital domain and converted into the analog domain through digital-to-analog converters (DACs). Such signals may be created utilizing a variety of methods and devices including arbitrary waveform generators that access waveform samples from memory in a circular manner.

Frequently, a signal consisting of a plurality of discrete sinusoids of known amplitude and phase are utilized. These signals typically are periodic with a period T. Fourier analysis indicates that the spectrum of such periodic signals will be composed of discrete tones spaced in the frequency domain at integer multiples of 1/T. Power spectrum 100 of such a signal is shown in FIG. 1 where $\omega_p = 2\pi/T$. Spectrums such as power spectrum 100 are commonly referred to as "comb" spectrums, because the tones resemble the teeth of a comb.

As shown in FIG. 2, these signals may be used as stimuli in system 200 to perform RF/IF testing. System 200 includes stimulus generator 201 that generates the desired signal in the digital domain. The digital I and Q symbols are provided to DACs 202 to convert the signal into the analog domain. The analog channels of the periodic signal may be provided to IQ modulator 203 (and possibly up/down converters which are not shown) to be translated to a desired RF/IF frequency. IQ modulator 203 mixes the received analog channels with an oscillator signal of frequency $\omega_{LO}$ from local oscillator (LO) 204. The modulated signal is provided to RF/IF channel 205. RF/IF channel 205 is the communication medium, system, or device being tested or calibrated. RF/IF channel 205 may also include any suitable up-converters and/or down-converters. As discussed herein, a "channel" shall refer to any system, device, communication medium, or combination thereof that may transmit and/or process a suitable signal in a manner appropriate for measurement, analysis, or calibration.

The signal that results after communication through and/or processing by RF/IF channel 205 may then be converted to the digital domain by analog-to-digital converter (ADC) 206. Alternatively, the resulting signal may be processed by an IQ demodulator (not shown) before conversion into the digital domain. The digital version of the resulting signal may then be analyzed by signal analysis system 207. In general, the frequency content of the resulting signal is determined by employing a Discrete Fourier Transform (e.g., the Fast Fourier Transform (FFT)). From the frequency representation of the resulting signal, the frequency response of RF/IF channel 205 at the corresponding frequencies (which may be translated) may be determined.

It shall be appreciated that if IQ modulator 203 does not maintain the desired amplitude and phase relationships of the stimulus signal, errors in the measured frequency response will occur. In practice, IQ modulators commonly suffer from several dominant impairments such as LO leakage and amplitude and phase imbalance. LO leakage manifests itself as an undesired spectral spur at the local oscillator frequency ($\omega_{LO}$). LO leakage may be modeled as undesired DC offsets in the I and Q inputs. Amplitude imbalance occurs when the gain of the I channel and the gain of the Q channel are not equal. Phase imbalance occurs when the quadrature split of the LO signal for multiplication by the I and Q signals is not precisely at 90 degrees. As known in the art, amplitude and phase imbalance are manifested through the generation of a spectrally inverted image of the desired signal.

An example of artifacts generated by IQ modulator impairments is shown in FIG. 3. Impaired spectrum 300 comprises three spectral components 301, 302, and 303 that result from the application of the complex excitation associated with an Upper Sideband (USB) tone at frequency $\omega_S$ to an impaired IQ modulator that utilizes a local oscillator of frequency $\omega_{LO}$. Spectral component 302 (at $\omega_S + \omega_{LO}$) is the desired spectral component to be produced by the IQ modulation. However, impaired spectrum 300 further comprises spectral component 301 (located at $\omega_{LO}$) due to the LO leakage of the IQ modulator. Spectral component 303 is observed at the image frequency ($\omega_S - \omega_{LO}$) as the result of the amplitude and/or phase imbalance of the IQ modulator.

The performance of IQ modulators is commonly characterized by the level of suppression of the undesired image as a measure of the amplitude and phase balance and the amount of the LO feedthrough. Greater suppression of these artifacts is associated with better modulators. Common values for the suppression of these terms is 20-30 dB suppression of the LO signal and 20-40 dB suppression for the inverted image. However, for some measurements or calibration functions, these levels need to be reduced to 40-50 dB (or greater) to achieve the desired accuracy. The cost (if even possible) of implementing modulators satisfying these levels of suppression may be prohibitive.

BRIEF SUMMARY

Representative embodiments preprocess or predistort a stimulus signal before IQ modulation to cause the processed or distorted signal to be robust against IQ modulator impairments. Additionally, after the stimulus signal is communicated through a channel, the resulting signal may be analyzed by a suitably adapted Discrete Fourier Transform (DFT) to isolate each desired frequency component from the inverted image spurs, the LO leakage, and other desired frequency components.

Specifically, the discrete sinusoids of a stimulus signal may be generated to be spaced in the frequency domain by $2\pi/T$ ($\omega_p$) to produce a comb spectrum. The original stimulus signal is then translated in the frequency domain by $\omega_p/4$. It shall be appreciated that the present invention is not limited to translating the stimulus signal by $\omega_p/4$. Other suitable translations may occur according to representative embodiments as will be discussed in greater detail below. For the convenience of the reader, the translation for this embodiment may be expressed mathematically as follows:

$$s'(n) = s(n) e^{j n \omega_p n/2},$$

where s'(n) is the translated digital signal and s(n) is a digital signal of four periods of the original stimulus signal. It shall be appreciated that the translated signal is periodic with period 4T.

The generation of a signal in this manner may occur in a number of ways. For example, four periods of the original stimulus signal may be stored in a suitable memory as complex waveform samples. The complex waveform samples may be retrieved from memory and multiplied by the appropriate complex values. After multiplication, the resulting values may be written to memory to replace the original values. After multiplying all of the complex waveform samples in this manner, the original stimulus signal will be translated in the frequency domain by the desired amount. Alternatively, the translation may occur in a real-time manner by multiplying the original complex waveform samples by the output of a complex numerically controlled oscillator (NCO) before provision to DACs.

By translating the original stimulus signal in this manner, the inverted image that results from the IQ modulator impairments will not occur at frequencies that coincide with frequencies associated with the desired signal. Instead, the frequency components of the inverted image will occur at their own unique frequencies. Thus, the frequency components associated with the inverted image may be isolated thereby removing their effect from the frequency analysis.

The isolation of the frequency components associated with the inverted image may occur utilizing a number of mechanisms. In representative embodiments, a suitably selected Discrete Fourier Transform (DFT) may be utilized to isolate the inverted image components. Specifically, a DFT may be implemented such that the spacing of frequency bins of the DFT equals the frequency offset. When a rectangular window is used for the DFT, the window will be characterized by a "sinc" response. By utilizing the suitably selected frequency offset and the suitably implemented DFT with a rectangular window, the sinc response associated with each frequency bin will exhibit a "zero" at every other frequency bin. Thus, it is observed that there is no leakage of the power associated with the inverted image components into the frequency bins associated with the desired frequency components thereby isolating the inverted image components. Likewise, there is no leakage between the desired frequency bins and there is no leakage of power from the LO into the desired frequency bins. Accordingly, the accuracy of the signal analysis is appreciably improved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the representative embodiments, reference is now made to the following descriptions taken in conjunction with the accompanying drawings, in which.

DETAILED DESCRIPTION

Figure 1:
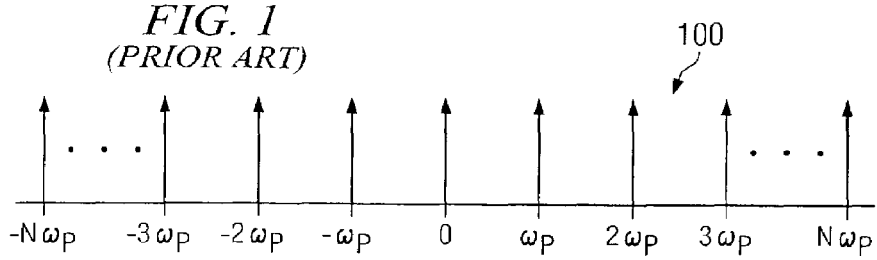
FIG. 1 depicts a stimulus signal according to the prior art.
Figure 2:
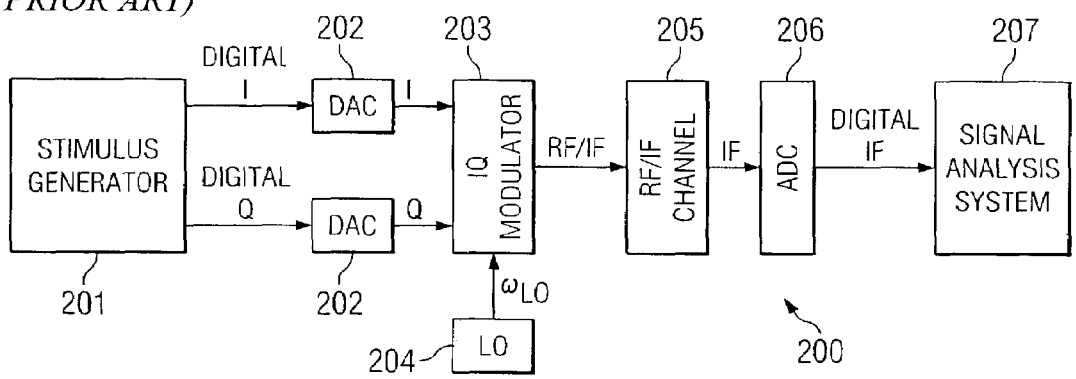
FIG. 2 depicts a system that performs signal analysis according to the prior art.
Figure 3:
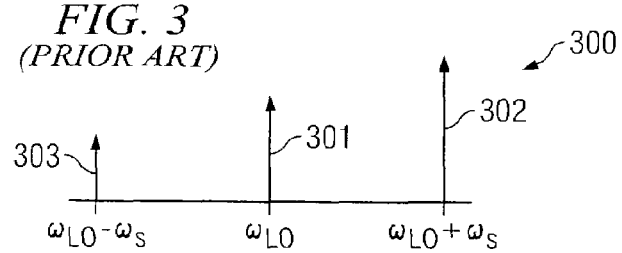
FIG. 3 depicts a power spectrum that includes artifacts associated with IQ modulator impairments according to the prior art.
Figure 4:
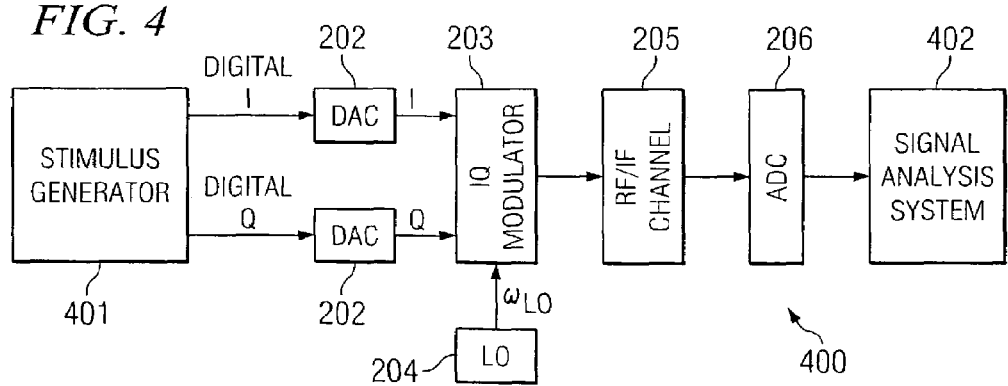
FIG. 4 depicts a system that performs signal analysis according to representative embodiments.

FIG. 4 depicts system 400 that performs signal analysis according to representative embodiments. System 400 comprises stimulus generator 401 that generates a periodic signal that is robust against IQ modulation impairments. The signal generated by stimulus generator 401 may advantageously be a periodic signal including a plurality of discrete sinusoids having known amplitude and phase relationships. The sinusoids may be separated by a frequency spacing. Furthermore, the sinusoids may be offset in the frequency domain by a predetermined amount.

Figure 5:
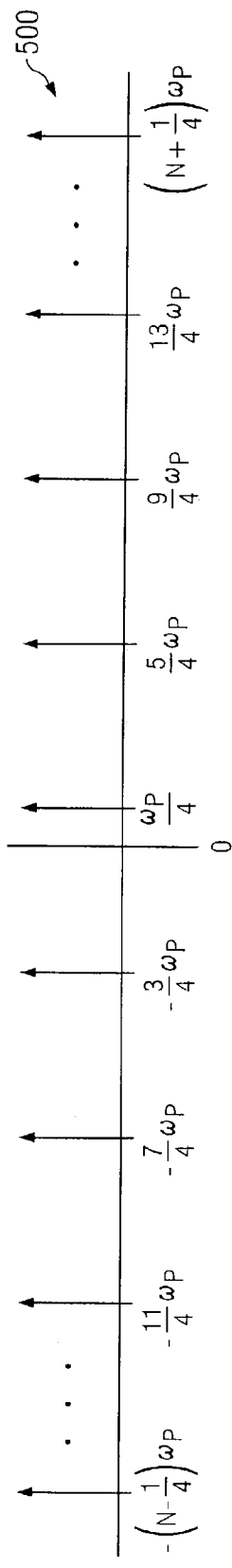
FIG. 5 depicts a power spectrum of a stimulus signal according to representative embodiments.

An example of a suitable signal generated according to representative embodiments is shown in the frequency domain in FIG. 5. Specifically, translated power spectrum 500 comprises a plurality of discrete tones which are separated in the frequency domain by $\omega_p$. Additionally, the plurality of discrete tones are offset by $\omega_p/4$. Thus, the tones occur at $(n+1/4)\omega_p$, where n is an integer that ranges from –N to N.

Returning to the description of FIG. 4, stimulus generator 401 may be implemented in any number of ways. For example, stimulus generator may be implemented on a suitable digital signal processor. Stimulus generator 401 may be implemented utilizing an arbitrary waveform generator that retrieves complex waveform samples of the periodic and offset stimulus signal from memory in a circular manner. Alternatively, stimulus generator 401 may be implemented to retrieve complex waveform samples of a non-offset suitable periodic waveform from memory. These samples may be offset in the frequency domain by utilizing a complex NCO. The I and Q channels of the complex periodic and offset waveform may be provided to respective DACs 202 to convert the waveform to the analog domain.

Figure 6:
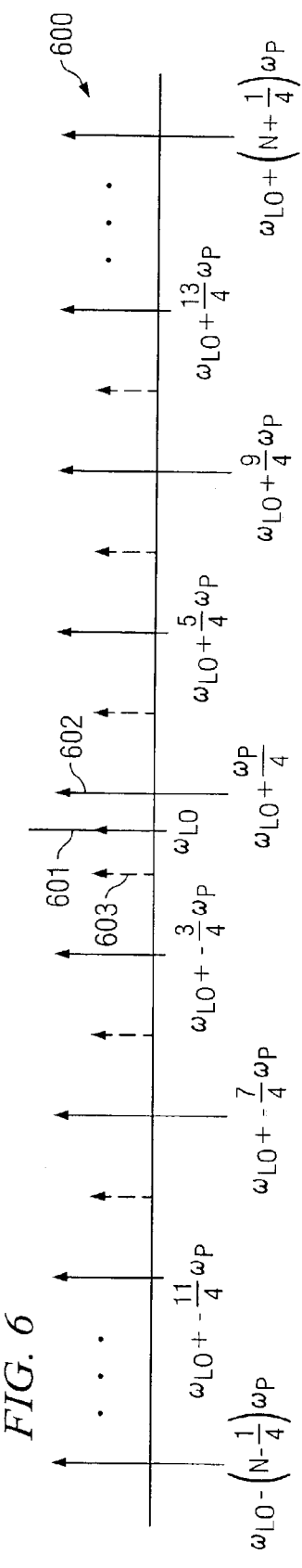
FIG. 6 depicts a power spectrum of the signal shown in FIG. 5 modulated by an impaired IQ modulator according to representative embodiments.

The analog channels may be provided to IQ modulator 203 (and possibly up/down converters) to be translated to a desired RF/IF frequency. IQ modulator 203 mixes the received analog channels with an oscillator signal of frequency $\omega_{LO}$ from local oscillator (LO) 204. IQ modulator 203 may suffer from LO leakage and amplitude/phase imbalance. Accordingly, the modulated signal includes artifacts as shown in power spectrum 600 of the modulated signal (FIG. 6). Specifically, power spectrum 600 includes frequency component 601 at $\omega_{LO}$ which is the result of LO leakage.

Power spectrum 600 further includes inverted image spurs of the desired tonal components. For example, spur 603 is the inverted image of tonal component 602. However, because of the frequency offset, none of the image spurs coincide with the desired tonal components. Specifically, the tonal components of the modulated signal occur at $\omega_{LO}+(n+1/4)\omega_p$ while the inverted image spurs occur at $\omega_{LO}+(n-1/4)\omega_p$, where n is an integer that ranges from –N to N. Thus, the image spurs are separated from the desired tonal components.

Returning to FIG. 4, the modulated signal is provided to RF/IF channel 205. The signal that results after communication through and/or processing by RF/IF channel 205 may then be converted to the digital domain by analog-to-digital converter (DAC) 206. Alternatively, the resulting signal may be processed by an IQ demodulator (not shown) before conversion into the digital domain. The digital version of the resulting signal may then be analyzed by signal analysis system 402. In general, the frequency content of the resulting signal may be determined by employing a DFT.

The implementation of the DFT employed by analysis system 402 may be adapted to the signal generated by stimulus generator 401. Specifically, analysis system 402 may advantageously employ a DFT that possesses a frequency resolution that equals the frequency offset ($\omega_p/4$). Specifically, the frequency bins of the calculated DFT may advantageously be separated by $\omega_p/4$ when a stimulus signal is utilized that possesses power spectrum 500. By utilizing a suitably selected frequency offset and a suitably implemented DFT with a rectangular window, the sinc response associated with each frequency bin will exhibit a "zero" at every other frequency bin. Thus, it is observed that there is no leakage of the power associated with the inverted image components into the frequency bins associated with the desired frequency components thereby isolating the inverted image components. Likewise, there is no leakage between the desired frequency bins and there is no leakage of power from the LO into the desired frequency bins. Accordingly, the accuracy of the signal analysis is appreciably improved.

It shall be appreciated that the present invention is not limited to utilizing a frequency offset of $\omega_p/4$. For example, an offset of an odd integer multiple of $\omega_p/4$ may be employed to separate the modulated frequency components associated with the desired discrete tones from the inverted image spurs. Likewise, the offset of $\omega_p/3$ may be utilized to separate the modulated frequency components associated with the desired discrete tones from the inverted image spurs. Modification of the offset in this manner would also involve modification of the DFT utilized to separate the image spur into separate frequency bins of the transform data. In this case, utilization of the offset of $\omega_p/3$ involves utilizing a DFT length that is multiple of 3. Accordingly, it may be preferred to utilize the $\omega_p/4$ offset, because DFTs that have a length of the power of 2 are computationally more efficient.

Figure 7:
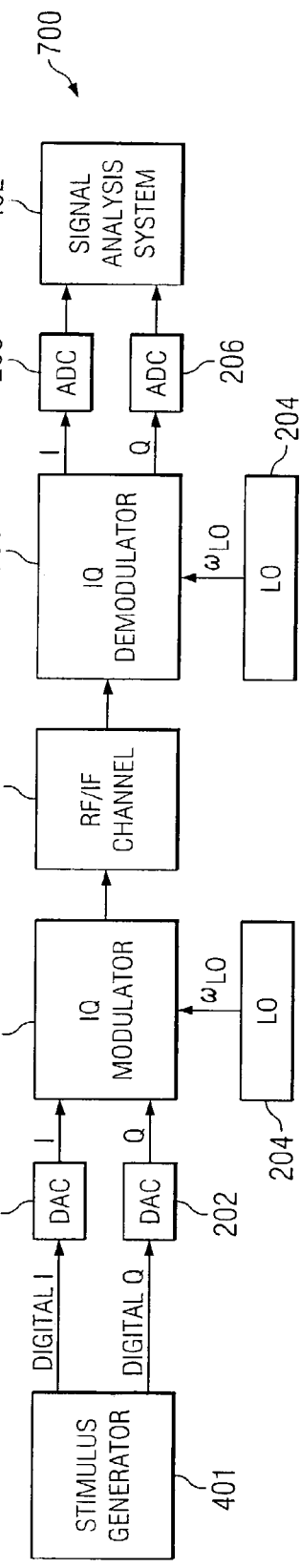
FIG. 7 depicts another system that performs signal analysis according to representative embodiments.

Representative embodiments may utilize a suitably generated stimulus signal to compensate for impairments produced by an IQ demodulator. FIG. 7 depicts system 700 according to representative embodiments. System 700 is substantially similar to system 200 except that system 700 includes IQ demodulator 701 that performs demodulation before ADCs 206 are operable. The frequency spacing and frequency offset employed by stimulus generator 401 are also operable to prevent the impairments associated with IQ demodulator 701 from reducing the accuracy of the signal analysis performed by signal analysis system 402.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for generating a signal to facilitate frequency analysis, comprising:
   a stimulus generator that generates a plurality of discrete tones according to a frequency spacing and a frequency offset to produce a comb spectrum, wherein the frequency offset is a fraction of the frequency spacing;
   an IQ modulator that modulates said plurality of discrete tones to generate a modulated signal that includes a respective spectrally inverted spur for each of said plurality of discrete tones, wherein said frequency spacing and said frequency offset cause said spectrally inverted spurs to occur at frequencies other than frequencies of said modulated signal that are associated with said plurality of discrete tones;
   a channel for communication of said modulated signal; and
   a frequency analyzer that analyzes said modulated signal after communication through said channel, wherein said frequency analyzer is operable to generate an estimated frequency response of said channel by excluding frequencies of said modulated signal that are associated with said spectrally inverted spurs;
   wherein said frequency analyzer performs a Discrete Fourier Transform (DFT) on samples of said demodulated signal;
   wherein said frequency spacing equals $\omega_p$, said frequency offset equals an integer multiple of $\omega_p/N$, and N is an integer; and
   wherein said DFT has a frequency resolution of $\omega_p/N$.

2. The system of claim 1 wherein said stimulus generator retrieves waveform samples from memory in a circular manner to generate said plurality of discrete tones.

3. The system of claim 1 wherein said stimulus generator utilizes a numerically controlled oscillator to generate said frequency offset.

4. The system of claim 1 wherein said stimulus generator is implemented on a digital signal processor.

5. The system of claim 1 further comprising:
   digital-to-analog converters that convert said plurality of discrete tones from a digital domain to an analog domain before modulation by said IQ modulator.

6. The system of claim 1 further comprising:
   an IQ demodulator that demodulates said modulated signal after communication through a channel.

7. The system of claim 1 wherein N equals 4 and said integer multiple is one.

8. A method for generating a signal to facilitate frequency analysis, comprising:
   generating a plurality of discrete tones according to a frequency spacing and a frequency offset to produce a comb spectrum, wherein the frequency offset is a fraction of the frequency spacing;

modulating said plurality of discrete tones to generate a modulated signal, wherein said modulating generates a respective spectrally inverted spur for each of said plurality of discrete tones, and wherein said frequency spacing and said frequency offset cause said spectrally inverted spurs to occur at frequencies other than frequencies of said modulated signal that are associated with said plurality of discrete tones;

communicating said modulated signal through a channel;

analyzing said modulated signal after communication through said channel to generate a frequency representation; and creating an estimated frequency response of said channel by excluding frequencies of said frequency representation that are associated with said spectrally inverted spurs;

wherein said frequency spacing is $\omega_p$, said frequency offset is an integer multiple of $\omega_p/N$, and N is an integer; and wherein said analyzing said modulated signal utilizes a Discrete Fourier Transform (DFT) that possesses a frequency resolution of $\omega_p/N$.

9. The method of claim 8 wherein N is an even integer that is greater than two and said integer multiple of $\omega_p/N$ is an odd multiple of $\omega_p/N$.

10. The method of claim 8 wherein said modulating is performed by an IQ modulator.

11. The method of claim 8 wherein said generating a plurality of discrete tones is performed utilizing digital signal processing.

12. The method of claim 8 wherein said generating a plurality of discrete tones includes performing frequency-shifting utilizing a numerically controlled oscillator.

13. The method of claim 8 further comprising:

performing digital-to-analog conversion of said plurality of discrete tones before modulating said plurality of discrete tones.

14. A system for generating a signal to facilitate frequency analysis, comprising:

a stimulus generator that generates a plurality of discrete tones according to a frequency spacing and a frequency offset to produce a comb spectrum;

an IQ modulator that modulates said plurality of discrete tones to generate a modulated signal that includes a respective spectrally inverted spur for each of said plurality of discrete tones, wherein said frequency spacing and said frequency offset cause said spectrally inverted spurs to occur at frequencies other than frequencies of said modulated signal that are associated with said plurality of discrete tones;

a frequency analyzer that analyzes said modulated signal using a Discrete Fourier Transform having a frequency resolution equal to the frequency offset to isolate the spectrally inverted spurs.

15. The system of claim 14 wherein the Discrete Fourier Transform has a sine response.

16. A system comprising:

a signal generator operable to generate a plurality of discrete tones having a frequency spacing and a frequency offset;

an IQ modulator coupled to the signal generator, the IQ modulator being operable to provide a modulated signal; and a frequency analyzer coupled to a channel configured to receive the modulated signal and generate a demodulated signal, the frequency analyzer being operable to perform a Discrete Fourier Transform (DFT) operation on the demodulated signal, the DFT having a frequency resolution equal to the frequency offset.

17. A method comprising:

generating a signal comprising a plurality of discrete tones having a frequency spacing and a frequency offset;

modulating the signal;

providing the modulated signal to a channel configured to demodulate the modulated signal;

receiving the demodulated the signal; and performing a Discrete Fourier Transform (DFT) operation on the demodulated signal, the DFT having a frequency resolution equal to the frequency offset.

* * * * *